E. R. Rison,
Bed Bottom,
Nº 57,770.     Patented Sept. 4, 1866.
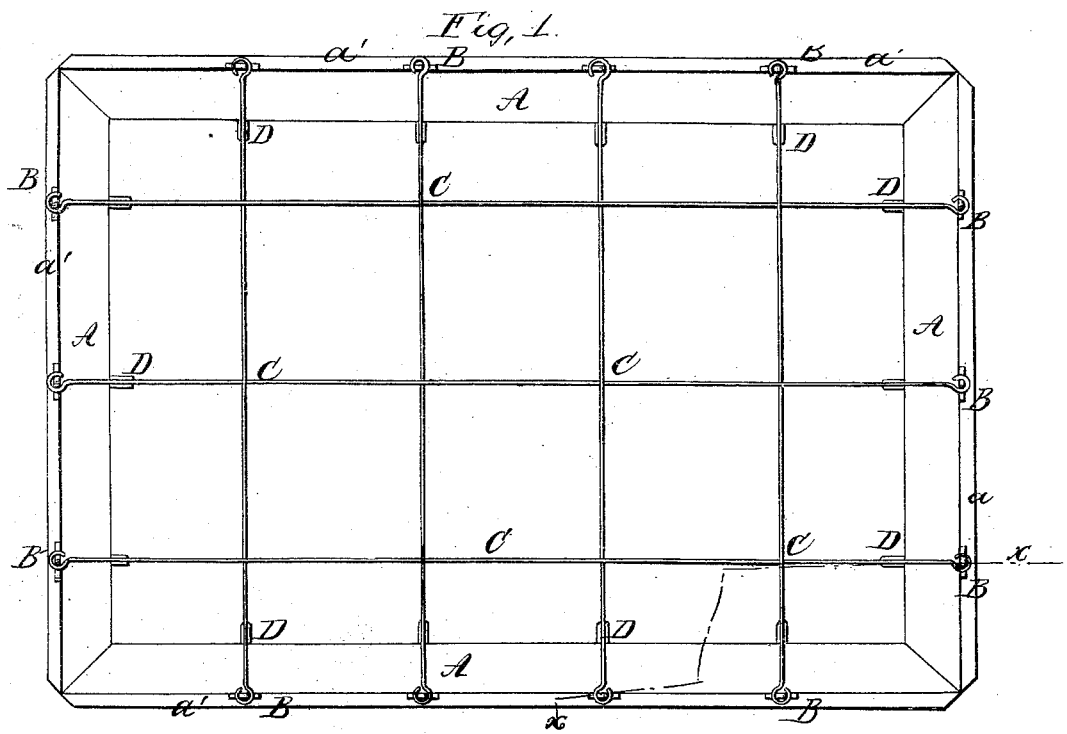
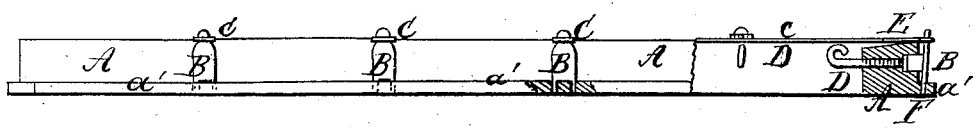
Witnesses
Jas. A. Service
Wm. Trevin
Inventor,
E. R. Rison
Per Munn & Co.
Attorneys

UNITED STATES PATENT OFFICE.

E. R. RISON, OF KINMUNDY, ILLINOIS.

IMPROVED BED-BOTTOM.

Specification forming part of Letters Patent No. 57,770, dated September 4, 1866.

*To all whom it may concern:*

Be it known that I, E. R. RISON, of Kinmundy, in the county of Marion and State of Illinois, have invented a new and useful Improvement in Spring Bed-Bottoms; and I do hereby declare that the following is a full, clear, and exact description thereof, which will enable others skilled in the art to make and use the same, reference being had to the accompanying drawings, forming part of this specification, in which—

Figure 1 is a top view of my improved spring bed-bottom. Fig. 2 is an edge view of the same, partly in section, through the line $x\ x$, Fig. 1.

Similar letters of reference indicate like parts.

My invention has for its object to furnish an improved spring bed-bottom simple in construction, strong, and not liable to break or get out of order; and it consists of the combination of the wires or cords, the upright supporting-pieces, the gum-elastic springs, the plates, and the screws with each other and with the frame of the bed-bottom, as hereinafter more fully described.

A is the frame of the bed-bottom, the lower edge of which rests upon cleats attached to the frame of the bedstead in the ordinary manner. B are the upright supporting-pieces, to the upper ends of which the wires or cords C are attached. Upon the lower ends of the pieces B are formed tenons or prongs, as shown in Fig. 2, which enter holes prepared for their reception in the flange $a'$, formed upon the lower side edge of the frame A, as shown in Figs. 1 and 2. This prevents the lower ends of the said pieces B from being forced outward by the strain of the wires or cords C.

The upper ends of the upright pieces B have heads formed upon them for the reception of the wires or cords C. The wires C have eyes formed upon their ends, which pass over the heads formed upon the upper ends of the upright pieces B, and the longitudinal wires are interwoven with the cross-wires, as shown in Fig. 1, so that they may mutually support each other.

The wires C may be replaced with cords, if desired; but I prefer to use wire, as first described, as being more satisfactory in its operation.

D are screws, which are screwed into holes formed through the frame A in the rear of each of the upright pieces B. The outer ends of the said holes are countersunk, and in the chambers thus formed are placed small metallic plates E, against which the forward ends of the screws D press, and gum-elastic springs F, the forward sides of which press against the rear sides of the upright pieces B, as shown in Fig. 2.

By turning the screws D forward, the springs F are forced outward against the upright pieces B, and by this means the elasticity or spring of the bed-bottom is regulated.

I claim as new and desire to secure by Letters Patent—

The combination of the wires or cords C, the upright supporting-pieces B, the gum-elastic springs F, the plates E, and screws D with each other and the frame A of the bed-bottom, substantially as herein shown and described, and for the purpose set forth.

E. R. RISON.

Witnesses:
H. H. CHESLEY,
I. V. SAWYER.